(12) United States Patent
Baltasar Badaya et al.

(10) Patent No.: US 12,053,874 B2
(45) Date of Patent: Aug. 6, 2024

(54) METHOD FOR DETERMINING A POSITION OF A RACK ON A RACK PLACEMENT UNIT OF A LABORATORY HANDLING SYSTEM AND LABORATORY HANDLING SYSTEM

(71) Applicant: Roche Diagnostics Operations, Inc., Indianapolis, IN (US)

(72) Inventors: Raul Baltasar Badaya, Stuttgart (DE); Ricardo Cristino, Tamm (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 539 days.

(21) Appl. No.: 17/008,795

(22) Filed: Sep. 1, 2020

(65) Prior Publication Data

US 2021/0069912 A1 Mar. 11, 2021

(30) Foreign Application Priority Data

Sep. 5, 2019 (EP) ..................... 19195576

(51) Int. Cl.
*B25J 13/08* (2006.01)
*B01L 3/00* (2006.01)
*B01L 9/06* (2006.01)
*B25J 15/08* (2006.01)
*B25J 19/02* (2006.01)

(52) U.S. Cl.
CPC .............. *B25J 13/089* (2013.01); *B01L 9/06* (2013.01); *B25J 19/022* (2013.01); *B01L 3/5082* (2013.01); *B25J 15/08* (2013.01)

(58) Field of Classification Search
CPC ........ B25J 13/089; B25J 19/022; B25J 15/08; B01L 9/06; B01L 3/5082; B65G 1/04; B65G 1/137; G01N 2035/0493; G01N 35/0099; G01N 2035/041; G01N 2035/0412; G01N 2035/0418; G01N 35/04
See application file for complete search history.

(56) References Cited

U.S. PATENT DOCUMENTS

| 8,940,252 B2 | 1/2015 | Ziegler |
| 2005/0158212 A1 | 7/2005 | Yavilevich |
| 2009/0191095 A1 | 7/2009 | Nakamura |
| 2011/0039709 A1 | 2/2011 | Lips et al. |
| 2011/0316713 A1 | 12/2011 | Okubo |

(Continued)

FOREIGN PATENT DOCUMENTS

| EP | 3444616 A1 | 2/2019 |
| WO | 2008/012104 A2 | 1/2008 |

(Continued)

*Primary Examiner* — Jason Holloway
*Assistant Examiner* — Blake A Wood
(74) *Attorney, Agent, or Firm* — Woodard, Emhardt, Henry, Reeves & Wagner, LLP (57) ABSTRACT

A method for determining a position of a rack on a rack placement unit of a laboratory handling system is presented. The rack is configured to carry a number of laboratory sample containers. The method comprises measuring a height profile of the rack, determining at least one corner region of the rack based on the measured height profile of the rack, and determining the position of the rack based on the determined at least one corner region of the rack.

15 Claims, 4 Drawing Sheets

(56) References Cited

U.S. PATENT DOCUMENTS

| | | | | |
|---|---|---|---|---|
| 2015/0075298 A1* | 3/2015 | Hecht | .................. | G01N 35/026 |
| | | | | 422/65 |
| 2016/0377643 A1* | 12/2016 | Berberich | .............. | G01N 35/02 |
| | | | | 414/795.6 |
| 2017/0124704 A1* | 5/2017 | Wu | ....................... | G06T 7/0012 |
| 2018/0214880 A1* | 8/2018 | Ketner | ...................... | B01L 9/50 |

FOREIGN PATENT DOCUMENTS

| | | |
|---|---|---|
| WO | 2009/024587 A1 | 2/2009 |
| WO | 2010/121112 A2 | 10/2010 |
| WO | 2012/117310 A1 | 9/2012 |
| WO | 2013/070744 A2 | 5/2013 |
| WO | 2013/124115 A1 | 8/2013 |
| WO | 2017/167814 A1 | 10/2017 |

\* cited by examiner

METHOD FOR DETERMINING A POSITION OF A RACK ON A RACK PLACEMENT UNIT OF A LABORATORY HANDLING SYSTEM AND LABORATORY HANDLING SYSTEM

CROSS-REFERENCE TO RELATED APPLICATIONS

This application claims priority to EP 19195576.4, filed Sep. 5, 2019, which is hereby incorporated by reference.

BACKGROUND

The present disclosure generally relates to a method for determining a position of a rack on a rack placement unit of a laboratory handling system and to a laboratory handling system.

Laboratory handling systems such as, for example, in-sorters and out-sorters, are used in laboratory automation systems. The function of laboratory handling systems is the handling of laboratory sample containers comprising samples to be processed, e.g. by a laboratory station.

The laboratory sample containers are often stored in racks configured to store a certain number of laboratory sample containers. The number of laboratory sample containers to be stored depends on the type of the rack. Typically, the racks are placed on a rack placement unit of the laboratory handling system.

A major problem concerns the determination of the position of a rack on the rack placement unit.

Therefore, there is a need for a method for determining a position of a rack on a rack placement unit of a laboratory handling system and a laboratory handling system having improved properties regarding the prior art.

SUMMARY

According to the present disclosure, a method for determining a position of a rack on a rack placement unit of a laboratory handling system is disclosed. The rack can be configured to carry a number of laboratory sample containers. The method can comprise measuring a height profile of the rack, determining at least one corner region of the rack based on the measured height profile of the rack, and determining the position of the rack based on the determined at least one corner region of the rack.

Accordingly, it is a feature of the embodiments of the present disclosure to provide for a method for determining a position of a rack on a rack placement unit of a laboratory handling system and a laboratory handling system having improved properties regarding the prior art. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A method for determining a position of a rack on a rack placement unit of a laboratory handling system, wherein the rack can be configured to carry or store a number of laboratory sample containers is presented. The method can comprise a) measuring a height profile of the rack, b) determining at least one corner region of the rack based on the measured height profile of the rack, and c) determining the position of the rack on the rack placement unit of the laboratory handling system based on the determined at least one corner region of the rack.

The term "corner region" as used according to the present disclosure may define a region or area of the rack where two or more, in particular three, edges of the rack meet or a point (a corner point) of the rack where two or more, in particular three, edges of the rack meet.

The term "height profile of the rack" as used according to the present disclosure may also be denoted as a vertical profile of the rack or as a profile of the rack in the z-direction or opposite to the z-direction.

According to one embodiment, step a) can comprise measuring a number of vertical distances between a distance sensing unit and the rack and/or the rack placement unit and/or a number of laboratory sample containers, which can be inserted in the rack, in x-direction and y-direction. The distance sensing unit may be coupled to a number of motors such as, for example, a number of linear motors, configured to move the distance sensing unit in x-direction and y-direction. The number of vertical distances measured between the distance sensing unit and the rack and/or the rack placement unit and/or the number of laboratory sample containers, which can be inserted in the rack, in x-direction and y-direction may be defined by a configurable resolution value based on the motional freedom of the number of motors such as, for example, the number of linear motors, configured to move the distance sensing unit in x-direction and y-direction.

According to one embodiment, the at least one corner region of the rack can be determined based on the measured number of vertical distances between the distance sensing unit and the rack and/or the rack placement unit and/or the number of laboratory sample containers, which can be inserted in the rack, in x-direction and y-direction.

According to one embodiment, the distance sensing unit can be assigned to a handling unit. The handling unit can be configured to insert laboratory sample containers in the rack or can be configured to remove laboratory sample containers from the rack based on the determined position of the rack. The handling unit may comprise two or more gripping fingers. The gripping fingers can be configured to grip a laboratory sample container. In one embodiment, the handling unit can be in the form of a gripper.

According to one embodiment, the distance sensing unit can be attached to the handling unit. In one embodiment, the distance sensing unit can be attached between two gripping fingers of the handling unit. For example, the distance sensing unit may be attached to a connection or joint such as, for example, solid body joint, between the two gripping fingers of the handling unit.

The connection or joint can be configured to allow a relative movement between the two gripping fingers of the handling unit.

According to one embodiment, the distance sensing unit can be attached laterally to the handling unit, i.e., to an exterior or outer face of the handling unit. In one embodiment, the distance sensing unit may not be attached between two gripping fingers of the handling unit.

In principle, there may be no limitation in respect of the form or shape of the distance sensing unit as long as the form or shape can allow measuring a number of vertical distances between the distance sensing unit and the rack and/or the rack placement unit and/or a number of laboratory sample containers, which can be inserted in the rack, in x-direction and y-direction. For example, the distance sensing unit may have a cylindrical such as, for example, circular cylindrical, i.e., tubular, form.

According to one embodiment, the distance sensing unit can comprise a laser or 3D laser scanner or can be in the form of a laser or 3D laser scanner. A laser or 3D laser scanner can facilitate a very accurate measurement of the height profile of the rack.

According to an embodiment, step b) can comprise determining the position of only one corner region of the rack based on the measured height profile of the rack.

According to an embodiment, step b) can comprises determining the position of two corner regions such as, for example, only two corner regions, of the rack based on the measured height profile of the rack.

According to an embodiment, step b) can comprise determining the position of two diametrically arranged corner regions of the rack based on the measured height profile of the rack.

The embodiments described in the three preceding paragraphs can have the advantage that the determination of the position of the rack on the rack placement unit of the laboratory handling system can be additionally accelerated.

According to an embodiment, step b) can comprise aligning or matching the measured height profile of the rack with a height profile of the rack known from CAD (Computer-Aided Design) data of the rack and/or with a height profile of the rack placement unit known from CAD (Computer-Aided Design) data of the rack placement unit and/or with a height profile of a laboratory sample container known from CAD (Computer-Aided Design) data of the laboratory sample container. Thus, the determination of the at least one corner region of the rack may be further accelerated.

According to one embodiment, the rack can comprise a number of orifices. Each orifice can be configured to receive a laboratory sample container and the following can be performed d) determining whether at least one of the number of orifices has received a laboratory sample container, i.e., can be occupied by a laboratory sample container, or not based on the measured height profile of the rack. Thus, additional issues of the rack, such as the presence of a number of laboratory sample containers on the rack and/or the type of the number of laboratory sample containers on the rack and/or a correct placement of the number of laboratory sample containers on the rack, may be determined.

The laboratory handling system can be configured to perform the above-described method.

In one embodiment, the laboratory handling system can be configured to handle a number of laboratory sample containers. A respective laboratory sample container can typically be designed as a tube made of glass or transparent plastic and typically can have an opening at an upper end. The laboratory sample container may be used to contain and/or store and/or transport a sample to be processed and/or analyzed, such as a blood sample, (blood) serum or plasma sample, urine sample, separation gel, cruor (blood cells) or a chemical sample. The laboratory sample container may be used to contain and/or store and/or transport any kind of biological liquid, for instance.

According to one embodiment, the laboratory handling system can comprise a number of racks. A rack can be configured to carry a number of laboratory sample containers. Reference is insofar made to the corresponding prior art. The number of racks may be, for example, a number in the range of about 1 up to about 1000. The number of laboratory sample containers carried by the respective rack may be, for example, a number in the range of about 2 up to about 150.

According to one embodiment, the laboratory handling system can further comprise a rack placement unit. At least one of the number of racks can be placed on the rack placement unit. The rack placement unit may comprise a flat metal plate having rack holding elements. The rack holding elements may be configured to detachably hold at least one of the number of racks placed on the rack placement unit. The operating principle of racks which are detachably held by rack holding elements is e.g., disclosed in DE 10 2008 058 755 A1, which is hereby incorporated by reference.

According to one embodiment, the laboratory handling system can further comprise a distance sensing unit. The distance sensing unit can be configured to sense a number of vertical distances between the distance sensing unit and the rack and/or the rack placement unit and/or a number of laboratory sample containers, which can be inserted in the rack, in x-direction and y-direction. In one embodiment, the distance sensing unit can comprise or can be in the form of a laser or 3D laser scanner.

According to one embodiment, the laboratory handling system can further comprise a handling unit. The handling unit can be configured to insert laboratory sample containers in the rack placed on the rack placement unit or to remove laboratory sample containers from the rack placed on the rack placement unit. The handling unit may comprise two or more gripping fingers. In one embodiment, the handling unit can be in the form of a gripper.

According to one embodiment, the distance sensing unit can be assigned to the handling unit. In one embodiment, the distance sensing unit may be attached to the handling unit such as, for example, between two gripping fingers of the handling unit. For example, the distance sensing unit may be attached to a connection or joint such as, for example, solid body joint, between the two gripping fingers of the handling unit. The connection or joint can be configured to allow a relative movement between the two gripping fingers of the handling unit. Alternatively, the distance sensing unit may be attached laterally to the handling unit.

The laboratory handling system may further comprise a number of motors such as, for example, a number of linear motors, configured to move the distance sensing unit and/or the handling unit in x-direction and y-direction.

The present disclosure can be featured by the following advantages: the determination of a position of a rack on a rack placement unit of a laboratory handling system can be achievable with a high level of accuracy; the determination of the position of the rack may be performed in a completely automated fashion, thus, human interaction can be dispensable and laboratory staff may carry out other activities while the method is performed, the concurrent determination of two or more racks can be possible without significant additional effort, additional issues with respect to the rack may be determined, such as the presence and/or the type and/or the correct placement of laboratory sample containers placed on the rack, and the present disclosure can be hardware-independent and thus applicable in connection with any kind of laboratory handling system.

Figure 1:
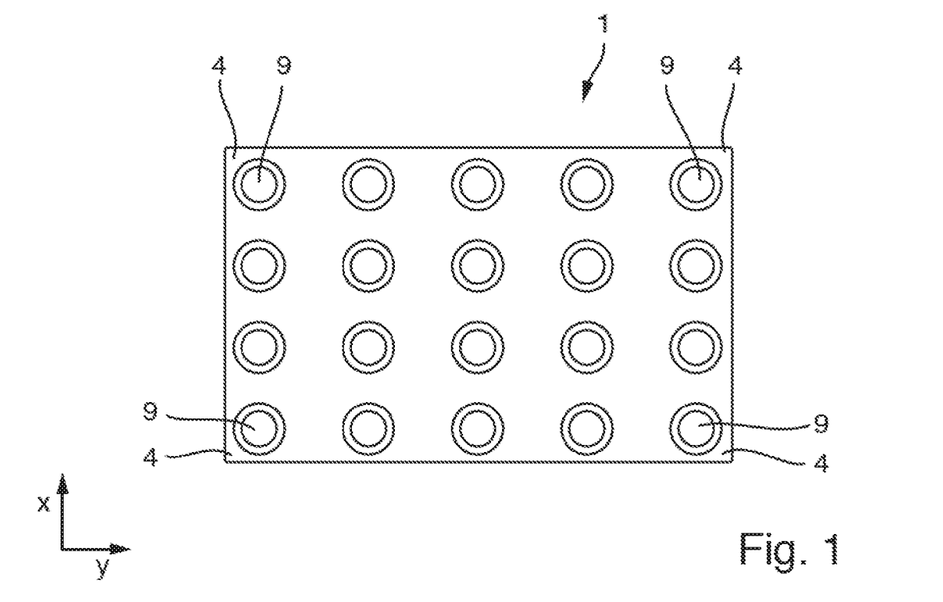
FIG. 1 illustrates schematically a laboratory sample container rack in a top view according to an embodiment of the present disclosure.

Referring initially to FIG. 1, FIG. 1 depicts a conventional laboratory sample container rack 1, i.e., a rack 1 configured to carry a number of laboratory sample containers 2, in a bottom view. The laboratory sample container rack 1 can comprise a number of 20 orifices 9, configured to receive conventional laboratory sample containers 2, which may also be denoted as tubes, (see also FIG. 6). The rack 1 can comprise four corner regions 4.

FIGS. 2a-d schematically depict an embodiment of step a) of the method.

Figure 4:
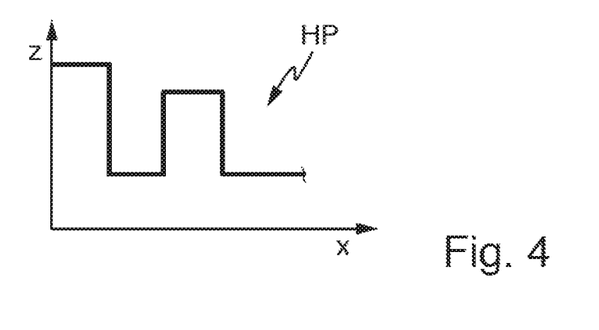
FIG. 4 illustrates schematically the height profile measured according to the embodiment of step a) of the method schematically illustrated in FIGS. 2a-d, according to an embodiment of the present disclosure.

A height profile HP of the rack 1 can be measured by measuring a number of 4 vertical distances DI, DI', DI" and DI''' between the distance sensing unit 5 on the one hand and the rack 1 and the rack placement unit 3 on the other hand in x-direction and y-direction. The respective height profile HP of the rack 1 is schematically depicted in FIG. 4.

Self-evidently, the height profile HP of the rack 1 may be measured by measuring a greater number of vertical distances between the distance sensing unit 5 on the one hand and the rack 1 and the rack placement unit 3 on the other hand in x-direction and y-direction.

The distance sensing unit 5 may be moved by a number of motors such as, for example, a number of linear motors, configured to move the distance sensing unit in x-direction and y-direction.

Figure 2A:
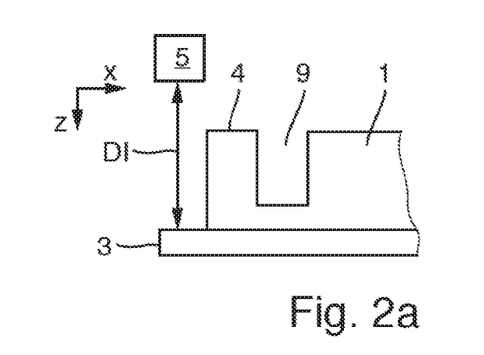
FIGS. 2a-d illustrate schematically a first embodiment of step a) of the method according to an embodiment of the present disclosure.
Figure 2B:
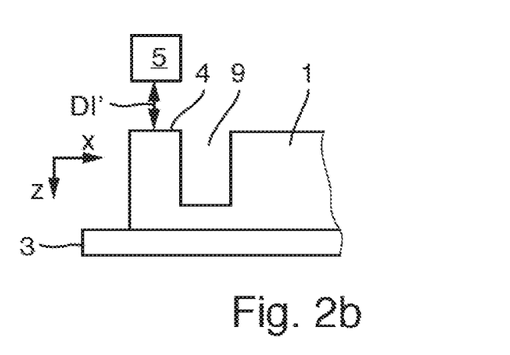
Figure 2C:
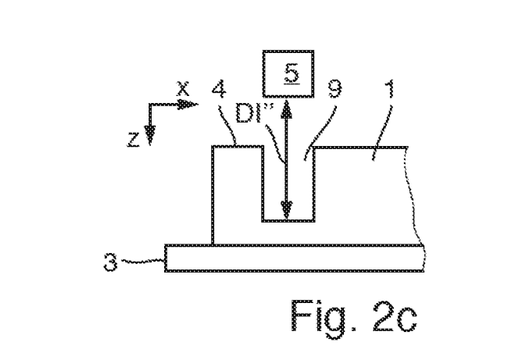
Figure 2D:
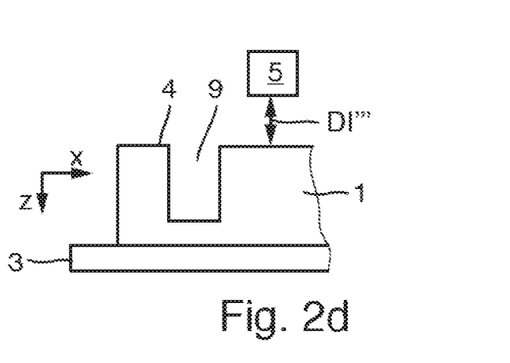

In detail, the step a) can comprise measuring a vertical distance DI between the distance sensing unit 5 and the rack placement unit 3 such as, for example, close to a corner region 4 of the rack 1, (see FIG. 2a), a vertical distance DI' between the distance sensing unit 5 and a corner region 4 of the rack 1 (see FIG. 2b), a vertical distance DI" between the distance sensing unit 5 and a bottom of an orifice 9 of the rack 1 (see FIG. 2c) and a vertical distance DI''' between the distance sensing unit 5 and a top surface of the rack 1 such as, for example, close to an orifice 9 of the rack 1 (see FIG. 2d).

Next, at least one corner region 4 such as, for example, two corner regions 4 such as, for example, two oppositely arranged corner regions 4, of the rack 1 can be determined based on the measured height profile HP of the rack 1 (step b)). This step may be carried out by aligning or matching the measured height profile HP of the rack 1 with a height profile of the rack 1 known from CAD (Computer-Aided Design) data of the rack 1 and with a height profile of the rack placement unit 3 known from CAD data of the rack placement unit 3.

Next, the position of the rack 1 on the rack placement unit 3 of the laboratory handling system 100 can be determined based on the determined at least one corner region 4 of the rack 1 (step c)).

FIGS. 3a-d schematically depict a further embodiment of step a) of the method.

Figure 5:
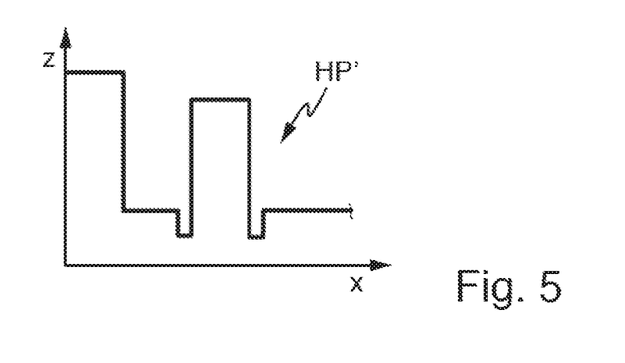
FIG. 5 illustrates schematically the height profile measured according to the embodiment of step a) of the method schematically illustrated in FIGS. 3a-f according to an embodiment of the present disclosure.

A height profile HP' of the rack 1 can be measured by measuring a number of 6 vertical distances DI, DI', DI", DI''', DI'''' and DI''''' between the distance sensing unit 5 on the one hand and the rack 1, the rack placement unit 3 and a number of laboratory sample container 2, which can be inserted in the rack 1, on the other hand in x-direction and y-direction. The respective height profile HP' of the rack 1 is schematically depicted in FIG. 5.

Self-evidently, the height profile HP' of the rack 1 may be measured by measuring a greater number of vertical distances between the distance sensing unit 5 on the one hand and the rack 1, the rack placement unit 3 and a number of laboratory sample container 2, which can be inserted in the rack 1, on the other hand in x-direction and y-direction.

The distance sensing unit 5 may be moved by a number of motors such as, for example, a number of linear motors, configured to move the distance sensing unit in x-direction and y-direction.

Figure 3A:
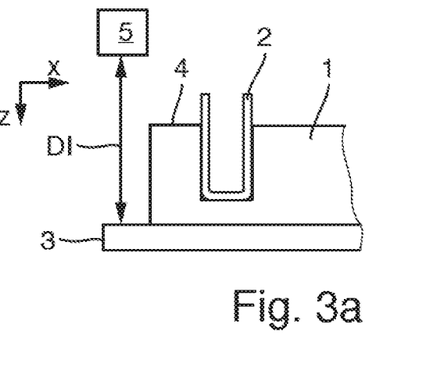
FIGS. 3a-f illustrate schematically a second embodiment of step a) of the method according to an embodiment of the present disclosure.
Figure 3B:
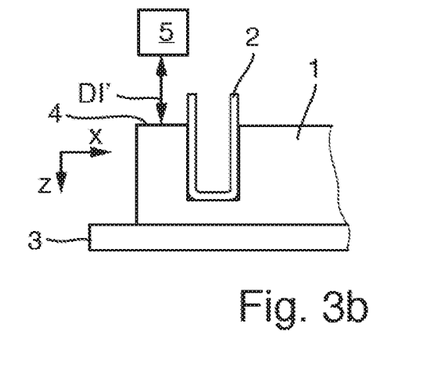
Figure 3C:
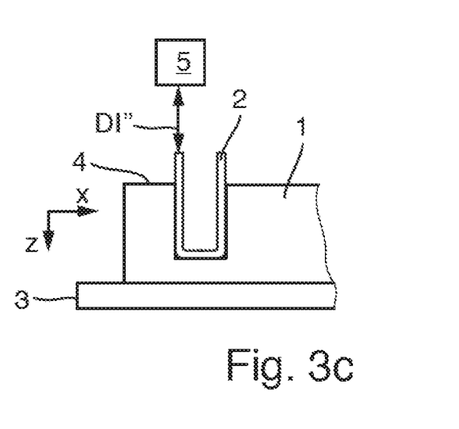
Figure 3D:
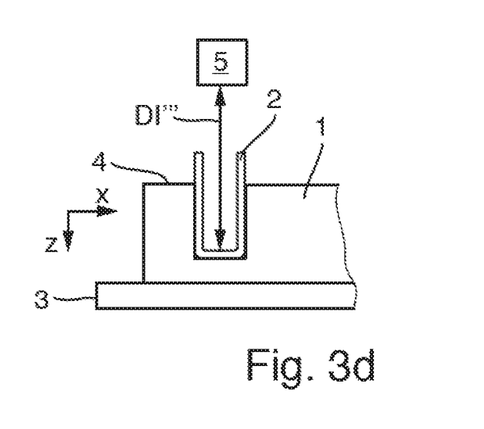
Figure 3E:
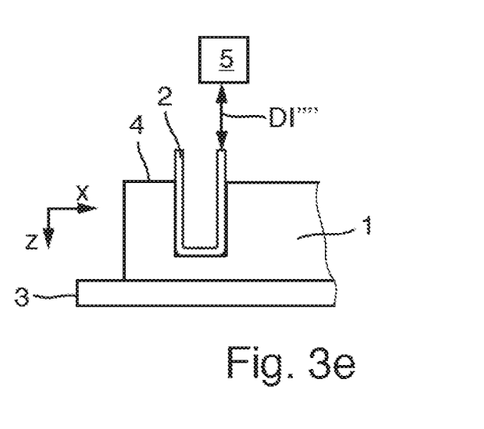
Figure 3F:
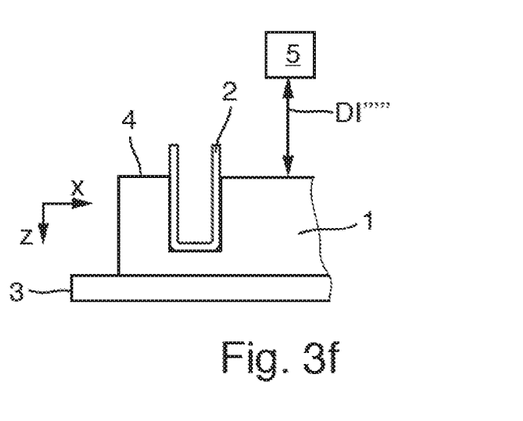

In detail, the step a) can comprises measuring a vertical distance DI between the distance sensing unit 5 and the bottom of the rack placement unit 3 such as, for example, close to a corner 4 of the rack 1, (see FIG. 3a), a vertical distance DI' between the distance sensing unit 5 and at least one corner region 4 of the rack 1 (see FIG. 3b), a vertical distance DI" between the distance sensing unit 5 and an upper end of a laboratory sample container 2 (see FIG. 3c), a vertical distance DI''' between the distance sensing unit 5 and a bottom of the laboratory sample container 2 (see FIG. 3d), a vertical distance DI'''' between the distance sensing unit 5 and the upper end of the laboratory sample container 2 (see FIG. 3e) and a vertical distance DI''''' between the distance sensing unit 5 and a top surface of the rack 1 such as, for example, close to the laboratory sample container 2 inserted in a respective orifice 9 of the rack 1, (see FIG. 3f).

Next, at least one corner region 4 such as, for example, two corner regions 4 such as, for example, two oppositely arranged corner regions 4, of the rack 1 can be determined based on the measured height profile HP' of the rack 1 (step b)). This step may be carried out by aligning or matching the measured height profile HP' of the rack 1 with a height profile of the rack 1 known from CAD data of the rack 1, with a height profile of the rack placement unit 3 known from CAD data of the rack placement unit 3 and with a height profile of the laboratory sample container 2 known from CAD data of the laboratory sample container 2.

Next, the position of the rack 1 on the rack placement unit 3 of the laboratory handling system 100 can be determined based on the determined at least one corner region 4 of the rack 1 (step c)).

Figure 6:
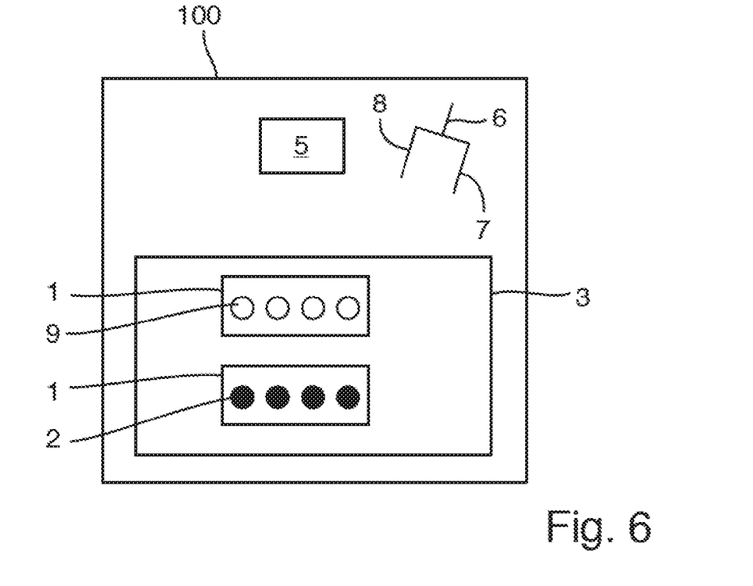
FIG. 6 illustrates schematically a laboratory handling system according to an embodiment of the present disclosure.

FIG. 6 schematically depicts an embodiment of a laboratory handling system.

The laboratory handling system 100 can comprise two racks 1. Each of the racks 1 can be configured to carry a number of laboratory sample containers 2. Further, each of the racks 1 can have 4 orifices 9 for holding and/or carrying laboratory sample containers 2. Self-evidently, the laboratory handling system may comprise more than two racks 1, e.g., about 3 to about 1000 racks 1. Self-evidently, the racks 1 may have more than four orifices 9, e.g., about 40 orifices 9. One of the two exemplary racks 1 can carry laboratory sample containers 2 and the remaining exemplary rack 1 may not carry laboratory sample containers 2.

The laboratory handling system 100 can further comprise a rack placement unit 3. The two exemplary racks 1 can be placed on the rack placement unit 3 of the laboratory handling system 100. The racks 1 can be detachably held by the rack placement unit 3.

The laboratory handling system 100 can further comprise a distance sensing unit 5. The distance sensing unit 5 can be configured to sense a number of vertical distances between the distance sensing unit 5 and the rack 1 and/or the rack placement unit 3 and/or a number of laboratory sample containers 2, which can be inserted in the rack 1, in x-direction and y-direction. In one embodiment, the distance sensing unit 5 can comprises or can be in the form of a laser or 3D laser scanner. A laser or 3D laser scanner can facilitate a high level of accuracy and error-proofness with respect to the measurement of the height profile of the rack 1.

The laboratory handling system 100 can further comprise a handling unit 6. The handling unit 6 can be configured to insert laboratory sample containers 2 in the racks 1 placed on the rack placement unit 3 or remove laboratory sample containers 2 from the racks 1 placed on the rack placement unit 3. The handling unit 6 can have two gripping fingers 7, 8 configured to grip a laboratory sample container 2.

Figure 7:
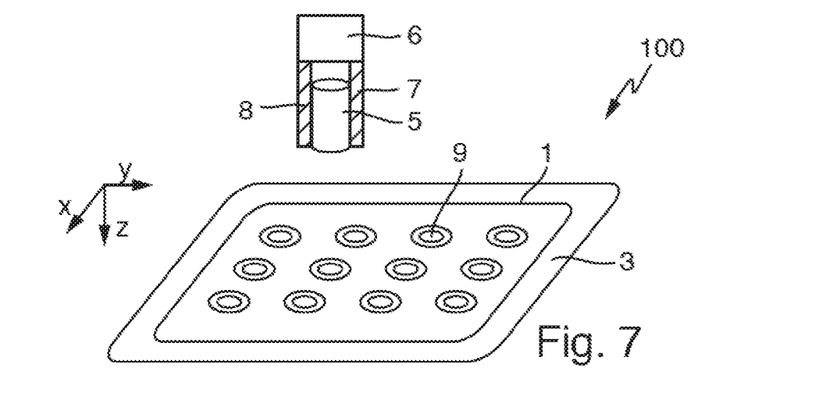
FIG. 7 illustrates schematically a laboratory handling system according to another embodiment of the present disclosure.

FIG. 7 schematically depicts a further embodiment of a laboratory handling system 100.

The laboratory handling system 100 can comprise a rack 1 configured to carry a number of laboratory sample containers. The rack 1 can have twelve orifices 9 for holding and/or carrying laboratory sample containers.

The laboratory handling system 100 can further comprise a rack placement unit 3. The rack 1 can be placed on the rack placement unit 3 of the laboratory handling system 100. Further, the rack 1 can be detachably held by the rack placement unit 3.

The laboratory handling system 100 can further comprise a distance sensing unit 5 configured to sense a number of vertical distances between the distance sensing unit 5 and the rack 1 and/or the rack placement unit 3 and/or a number of laboratory sample containers 2, which can be inserted in the rack 1, in x-direction and y-direction. The distance sensing unit 5 can be attached between two gripping fingers 7, 8 such as, for example, to a connection or joint configured to facilitate a relative movement of two gripping fingers 7, 8, of the handling unit 6. Further, the distance sensing unit 5 may have the form of a tube.

With respect to further features and advantages of the laboratory handling system 100, reference is made in its entirety to the description of FIG. 6.

The present disclosure proposes the use of a distance measurement device such as, for example, in the form of a laser or having a laser sensor. The distance measurement device may be placed at a gripper of a laboratory handling system or at a fixed position along the z-direction. An algorithm for determining the position of a rack configured to carry a number of laboratory sample containers and placed on a placement unit of the laboratory handling system may be used. The algorithm may be divided into two main sub-algorithms. The first main sub-algorithm may be configured to acquire data by making a 3D scan of the rack and the rack placement unit, in the following also denoted as workspace, by measuring the distance of the distance measurement device at each of the measurements points in the xy-plane (plane defined by the x-direction or x-axis and y-direction or y-axis). The amount of xy measurement points may be defined by a configurable resolution value (in mm or motor steps). For example, the first sub-algorithm may follow the subsequent steps:

1. Go to a first x position to start the measurement (not necessarily origin position).
2. Go to a first y position to start the measurement (not necessarily origin position).
   2.1. Take a depth measurement (e.g. using a laser sensor), save the value in memory together with the (x, y) coordinates where the measurement was taken.
   2.2. Move y axis resolution (mm).
   2.3. Go back to 2.1 until measurement range in y is covered.
3. Move x axis resolution (mm).
4. Go back to 2.1 until measurement range in x is covered.

The result/output data can be a (x, y, z) point cloud and may be interpreted as a 3D mapping of the workspace where the x- and y-values may come from motor encoders and the z-value may come from the distance measurement at (x, y).

The second main sub-algorithm may be configured to process data such as, for example, to figure out the physical coordinates of all the rack positions. In detail, the second main sub-algorithm may be configured to use the previous generated (x, y, z) point cloud to identify, for example, the first and last positions for the rack on the rack placement unit of the laboratory handling system. The coordinates of these two positions may be fed to a position computation algorithm. The algorithm may be simplified, for example, by using CCD information of the rack placement unit to estimate the position of the first and last rack position. Alternatively, data processing may be applied together with data acquisition to detect only the first rack position and its coordinates. Further, the rack database may be used to estimate the position of the last rack position based on the recently measured first rack position. Alternatively, data processing may be applied together with data acquisition to detect only the last rack position and its coordinates.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A method for determining a position of a rack on a rack placement unit of a laboratory handling system, wherein the rack is configured to carry a number of laboratory sample containers, the method comprising:
   a) measuring a number of vertical distances between a distance sensing unit and the rack and the rack placement unit in an x-direction to measure a continuous height profile of the rack in the x-direction, and measuring a number of vertical distances between a distance sensing unit and the rack and the rack placement unit in a y-direction to measure a continuous height profile of the rack in the y-direction, the x-direction and the y-direction being perpendicular to the height direction of the rack and perpendicular to each other, each continuous height profile comprising at least two successive vertical distances between the distance sensing unit and the rack and/or the rack placement unit, b) determining at least one corner region of the rack based on the continuous height profiles of the rack; and c) determining the position of the rack on the rack placement unit based on the determined at least one corner region of the rack in the x-direction and the y-direction.

2. The method according to claim 1, wherein the at least one corner region of the rack is determined based on the measured number of vertical distances between the distance sensing unit and at least one of the group comprising the rack, the rack placement unit, and the number of laboratory sample containers inserted in the rack, in the x-direction and the y-direction.

3. The method according to claim 1, wherein the distance sensing unit is assigned to a handling unit, wherein the handling unit is configured to insert laboratory sample containers in the rack or remove laboratory sample containers from the rack based on the determined position of the rack.

4. The method according to claim 3, wherein the distance sensing unit is attached between two gripping fingers of the handling unit.

5. The method according to claim 3, wherein the distance sensing unit is attached laterally to the handling unit.

6. The method according to claim 1, wherein the distance sensing unit comprises or is in the form of a laser or 3D laser scanner.

7. The method according to claim 1, wherein b) comprises determining the position of only one corner region of the rack based on the measured height profiles of the rack.

8. The method according to claim 1, wherein b) comprises determining the position of two corner regions of the rack based on the measured height profiles of the rack.

9. The method according to claim 1, wherein b) comprises determining the position of two diametrically arranged corner regions of the rack based on the measured height profiles of the rack.

10. The method according to claim 1, wherein b) comprises matching the measured height profile of the rack with a height profile of the rack known from:
computer-aided design (CAD) data of the rack,
CAD data of the rack placement unit, and/or
CAD data of the laboratory sample container.

11. The method according to claim 1, wherein the rack comprises a number of orifices, wherein each orifice is configured to receive a laboratory sample container.

12. The method according to claim 11, further comprising, d) determining, whether at least one of the number of orifices is occupied by a laboratory sample container or not based on the measured height profile of the rack.

13. A laboratory handling system, wherein the laboratory handling system is configured to perform the method according to claim 1.

14. The laboratory handling system according to claim 13, further comprising:

a number of racks, wherein a respective rack is configured to carry a number of laboratory sample containers;

a rack placement unit, wherein at least one of the number of racks is placed on the rack placement unit; and a distance sensing unit configured to sense a number of vertical distances between the distance sensing unit and the rack and the rack placement unit in an x-direction and a y-direction, the x-direction and the y-direction being perpendicular to the height direction of the rack and perpendicular to each other.

15. The laboratory handling system according to claim 14, further comprising:

a handling unit, wherein the handling unit is configured to insert laboratory sample containers in the rack being placed on the rack placement unit or remove laboratory sample containers from the rack being placed on the rack placement unit and the distance sensing unit is assigned to the handling unit.

* * * * *